US009404792B2

(12) United States Patent
Shimon et al.

(10) Patent No.: US 9,404,792 B2
(45) Date of Patent: Aug. 2, 2016

(54) AUTO-ALIGNMENT SYSTEM FOR HIGH PRECISION MASTED HEAD MIRROR

(71) Applicant: Raytheon Company, Waltham, MA (US)

(72) Inventors: Philip T. Shimon, Torrance, CA (US); Lacy G. Cook, El Segundo, CA (US); Brendan H. Robinson, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 350 days.

(21) Appl. No.: 13/932,921

(22) Filed: Jul. 1, 2013

(65) Prior Publication Data

US 2015/0001381 A1 Jan. 1, 2015

(51) Int. Cl.
| | | |
|---|---|---|
| *H01J 3/14* | (2006.01) | |
| *G01J 1/04* | (2006.01) | |
| *G01S 17/93* | (2006.01) | |
| *G01C 11/02* | (2006.01) | |
| *G01S 17/89* | (2006.01) | |
| *G02B 27/64* | (2006.01) | |
| *G01S 17/42* | (2006.01) | |
| *G02B 23/08* | (2006.01) | |
| *F41G 3/22* | (2006.01) | |

(52) U.S. Cl.
CPC . *G01J 1/04* (2013.01); *G01C 11/02* (2013.01); *G01C 11/025* (2013.01); *G01S 17/42* (2013.01); *G01S 17/89* (2013.01); *G01S 17/936* (2013.01); *G02B 23/08* (2013.01); *G02B 27/64* (2013.01); *G02B 27/644* (2013.01); *G02B 27/646* (2013.01); *G02B 27/648* (2013.01); *F41G 3/22* (2013.01)

(58) Field of Classification Search
CPC ...... G01C 11/02; G01C 11/025; G01S 17/42; G01S 17/89; G01S 17/936; G02B 27/64; G02B 27/644; G02B 27/648; G02B 23/08; G02B 27/646; G01J 1/04
USPC .............................................. 250/206.1, 216
See application file for complete search history.

(56) References Cited

U.S. PATENT DOCUMENTS

| 4,108,551 A | 8/1978 | Weber |
|---|---|---|
| 4,386,848 A | 6/1983 | Clendenin et al. |

(Continued)

FOREIGN PATENT DOCUMENTS

| EP | 2 105 706 A2 | 9/2009 |
|---|---|---|
| EP | 2 590 005 A1 | 5/2013 |

OTHER PUBLICATIONS

Notification of Transmittal of the International Search Report and the Written Opinion of the International Searching Authority, or the Declaration dated Aug. 21, 2014 in connection with International Patent Application No. PCT/US2014/035157.

*Primary Examiner* — Georgia Y Epps
*Assistant Examiner* — Kevin Wyatt

(57) ABSTRACT

According to an embodiment of the disclosure, an optical sensor system comprises a mast, a mast mirror, a navigation unit, one or more faceted mirrors, and at least two beam-steering mirrors. The mast is elevated from a vehicle. The mast mirror reflects signals either to or from object space along a line of sight. The navigation unit determines a location and attitude of the mast mirror. The one or more faceted mirrors reflect an error sensing beam to reveal a flexure of the mast mirror. The at least two beam-steering mirrors prevent the line of sight for the signals reflected off the mast mirror from walking off the mast mirror by adjusting an angle and translation of the signals reflected off the mast mirror.

20 Claims, 4 Drawing Sheets

(56) References Cited

U.S. PATENT DOCUMENTS

| | | | | |
|---|---|---|---|---|
| 4,830,489 A | * | 5/1989 | Cain et al. | 356/73 |
| 5,850,289 A | * | 12/1998 | Fowler | G01B 11/08 250/559.22 |
| 6,600,553 B1 | * | 7/2003 | Stone | 356/4.01 |
| 2001/0039740 A1 | * | 11/2001 | Kaneko | G02B 7/34 33/290 |
| 2002/0139926 A1 | | 10/2002 | Ansley | |
| 2002/0145102 A1 | | 10/2002 | Eckelkamp-Baker et al. | |
| 2008/0136923 A1 | * | 6/2008 | Inbar | G02B 27/646 348/208.2 |

* cited by examiner

AUTO-ALIGNMENT SYSTEM FOR HIGH PRECISION MASTED HEAD MIRROR

TECHNICAL FIELD

This disclosure is generally directed to systems that image their surroundings. More specifically, this disclosure is directed to an auto-alignment system for a high precision masted head mirror.

BACKGROUND

A variety of ground and air vehicle process signals corresponding to electromagnetic radiation and/or other signals from object space. These signals are used to ascertain information about items in object space. As non-limiting examples, the signals may correspond to an image of the object space, structures in the object space, or movement of things in the object space. As discussed below with reference to FIG. 1, certain conventional ground systems that require elevation accomplish their purpose of ascertaining information about object space, but have limitations.

SUMMARY

This disclosure provides a system that auto aligns a masted head mirror.

According to an embodiment of the disclosure, an optical sensor system comprises a mast, a mast mirror, a navigation unit, one or more faceted mirrors, and at least two beam-steering mirrors. The mast is elevated from a vehicle. The mast mirror reflects signals either to or from object space along a line of sight. The navigation unit determines a location and attitude of the mast mirror and the location of the mirror. The one or more faceted mirrors reflect an error sensing beam to measure angular displacement of the mast mirror. The at least two beam-steering mirrors prevent the line of sight for the signals reflected off the mast mirror from walking off the mast mirror by adjusting an angle and translation of the signals reflected off the mast mirror.

Certain embodiments may provide various technical advantages depending on the implementation. For example, a technical advantage of some embodiments may include the capability to mount optical system electronics in a vehicle while only placing a masted steering mirror and faceted error-sensing mirrors above a vehicle to capture signals from object space. A technical advantage of other embodiments may include the capability to mount more than one optical system in a vehicle that all use a common masted portion. Yet another technical advantage may include the capability to easily change one bench for another bench while re-using a masted portion that is mounted on a vehicle.

Although specific advantages are above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system.

Figure 1:
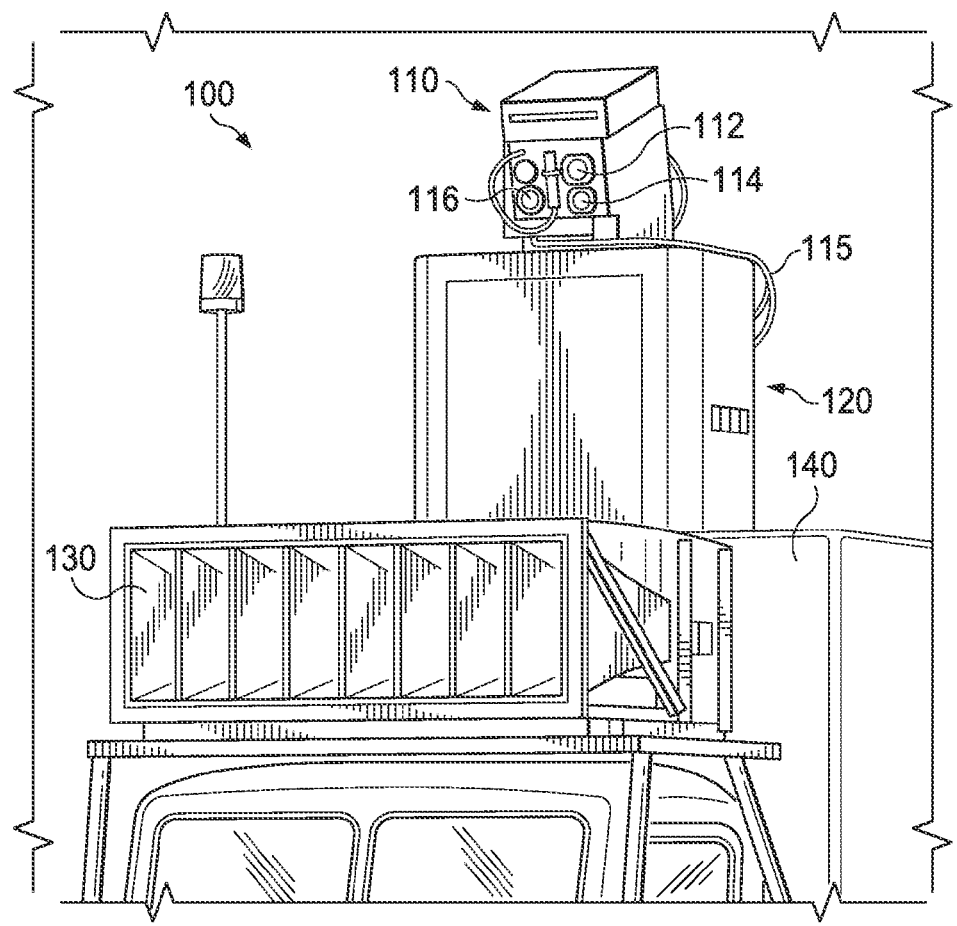
FIG. 1 is a view of a conventional system mounted on a vehicle.

FIG. 1 is a view of a conventional system 100 mounted on a vehicle 140. The conventional system 100 includes a laser vibrometer configured to measure variations in sound vibrations while the vehicle 140 moves.

As shown in FIG. 1, the system 100 includes a two-axis gimbaled unit 110 mounted on top of a half rack 120. The half rack 120, in turn, is mounted on top of the vehicle 140. The two-axis gimbaled unit 110 includes three ports: a laser port 112, a range finder port 114, and a camera port 116. As shown in FIG. 1, a plurality of cables 115 connects the equipment in the half rack 120 to the two-axis gimbaled unit 110. The system 100 also includes a GPS unit (not shown).

As will be recognized by one of ordinary skill in the art, a horn 130 emits a sound and the system 100 measures variations in the sound vibrations to detect objects such as land mines.

Although the conventional system 100 accomplishes its purpose and provides simplicity in its design, the convention system 100 has limitations. Because of the tremendous amount of cabling 115, the two-axis gimbaled unit 110 is limited to approximately ±25 degrees of rotation. Additionally, the combined weight of the two-axis gimbaled unit 110 and the half rack 120 can be 850 pounds or more, making it difficult to elevate the conventional system 100 up on the vehicle—especially when equipment support such a weight is not readily available.

Moreover, in the event a new system needs to be changed out for a different mission, switching between the two requires a day worth of work. Among other things, the gimbal needs to be changed out and the fiber cable needs to be spliced.

Given such limitations, certain embodiments of the disclosure provide a system that does not sacrifice performance (e.g., geolocation, field of regard, and weight). Additionally, certain embodiments of the disclosure provide a system that keeps sensitive components inside a vehicle—only elevating a head mirror. Additionally, certain embodiments of the disclosure provide a system that allows for more flexibility by allowing changes to the system to be in the vehicle and reutilizing a common head mast.

Figure 2:
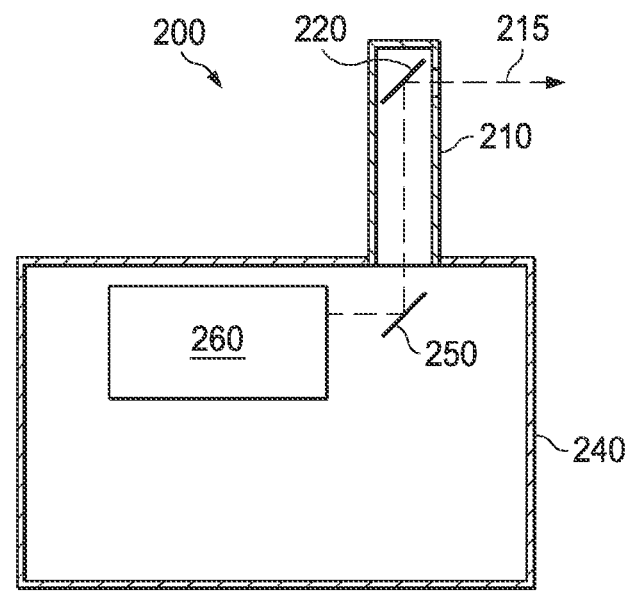
FIG. 2 is a simplified view of a system, according to an embodiment of the disclosure.

FIG. 2 is a simplified view of a system 200, according to an embodiment of the disclosure. The system 200 of FIG. 2 includes a mast 210, a head mirror 220, a pointing mirror 250 (e.g., a fast steering mirror), and laser equipment 260. The mast 210, which elevates the head mirror 220, is mounted on top of a vehicle 240. In particular embodiments, the mast 210 may have a variable height.

As shown in FIG. 2, the laser equipment 260 is positioned inside the vehicle 240 as opposed to on top of the vehicle 240. The pointing mirror 250 beams the laser 215 between the laser equipment 260 and the head mirror 220. Although a laser 215 will be described according to various embodiments, in other embodiments, a laser may not be utilized. In such embodiments, the laser 215 shown reflected from the head mirror 220 may be regarded as a direction for a line of sight that may be used for measuring signals that can be received, reflected, and/or processed by equipment within the vehicle.

Using the system 200 of FIG. 2, one gets the necessary height that may be necessary for sensing while avoiding inefficiencies of mounting laser equipment and/or gimbals on the vehicle. As will be described in later details below, because the inside of a vehicle can potentially house more equipment, multiple systems for different purposes may be housed with the vehicle 240. In particular configurations, all such systems may utilize the head mirror 220 for receipt of signals.

Although particular systems will be described herein, other systems may avail from teaching of the disclosure. Such systems include both passive and active systems. Additionally, such systems include image gathering and camera systems. Thus, while some systems will be described as emitting a laser, certain systems according to embodiment of the disclosure may simply gather signals. Again, in such systems, the laser may generally be considered the direction of the line of sight.

Figure 3:
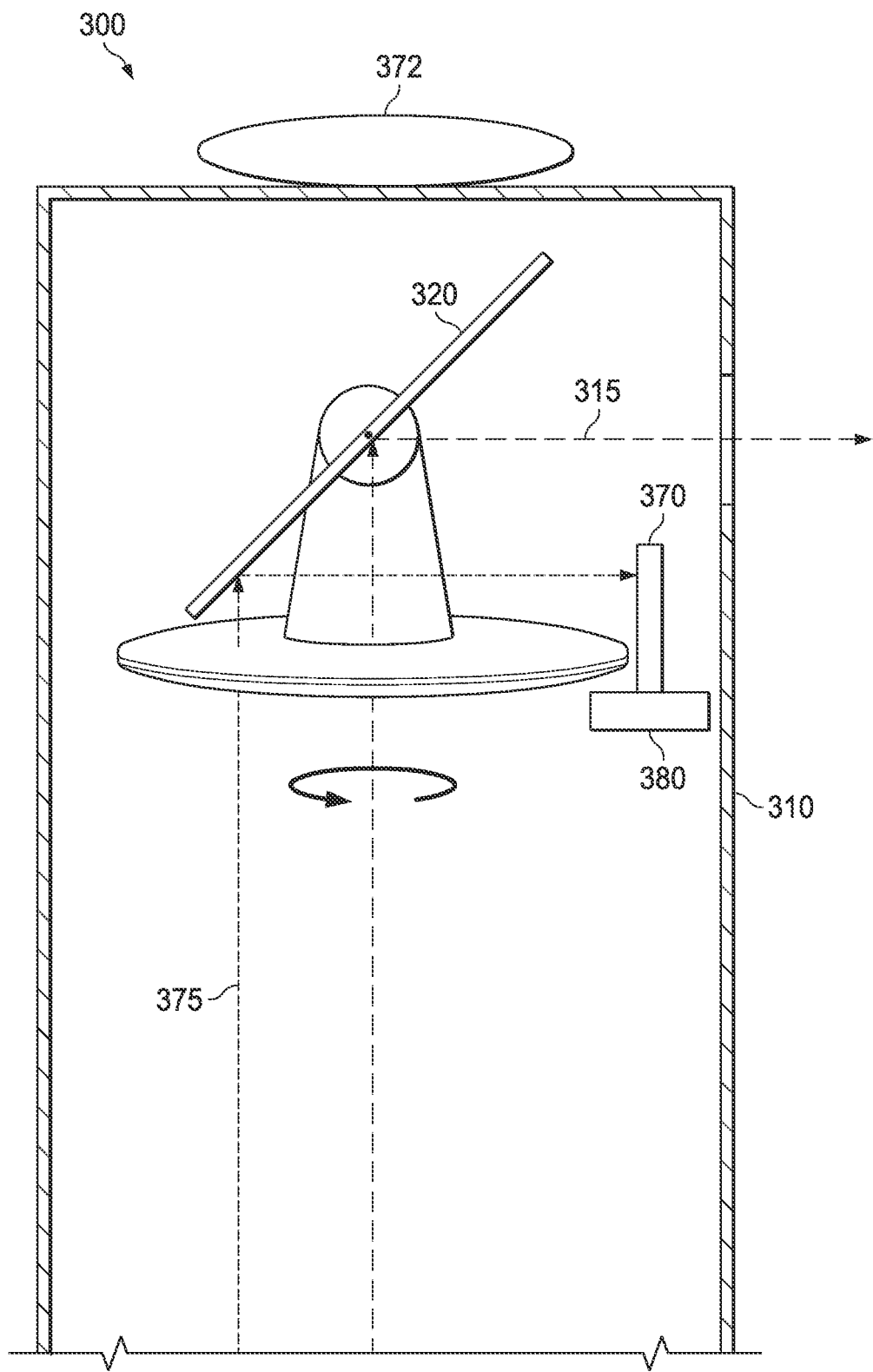
FIG. 3 is a view of further details of a mast of a system, according to an embodiment of the disclosure.

FIG. 3 is a view of further details of a mast 310 of a system 300, according to an embodiment of the disclosure. Similar to FIG. 2, the system 300 of FIG. 3 includes a mast 310 and a head mirror 320 that are designed to provide the elevation for a desired line of sight for a laser 315. Although specific features will be shown in the system 300, it should be understood that other embodiments may include more, fewer, or different components.

As indicated below, the mast 310 provides the necessary elevation for the laser while avoiding unnecessary weight being loaded on the vehicle. In this configuration, the head mirror 320 is no longer completely rigid with respect to the vehicle. That is, depending on the rigidity of the mast 310, the mast 310 has the potential to flex around and thereby also move the head mirror 320 with respect to the vehicle. Such movement is undesirable. If uncorrected, a flexing on the order of degrees may shift a desired line of sight. As a non-limiting example, one may desire a line of sight that is 30 meters in front of a vehicle. However, due to uncorrected flexing, the line of sight may be shifted to 25 meters.

According to particular embodiments, a system is provided to correct and/or account for the flexing caused by the mast 310. As shown in FIG. 3, a faceted mirror 370 is provided with a navigation unit 380 tied thereto. The navigation unit 380 may include an inertial measurement unit (IMU).

As readily recognized by one of ordinary skill in the art, an IMU may include three gyroscopes and three accelerometers. The output from these may be integrated and analyzed with software or logic to determine a relative location and attitude of the IMU. Therefore, through utilization of the navigation unit 380, we know the location of the head mirror 320. However, one would not necessarily know where the laser 315 is coming up to hit the head mirror 320. Accordingly, embodiments of the disclosure introduce an auto-alignment system, which utilizes a double-pass configuration. As described in greater detail below, the auto-alignment system uses the faceted mirror 370. An error sensing beam 375 travels with the laser 315 and hits the faceted mirror 370, thereby reflecting a signal back down electronics in the vehicle for analysis and correction of how the laser 315 hits the mirror.

The auto alignment system is designed to keep the laser 315 pointed in a particular direction. In certain configurations, this may be straight out relative to the head mirror 320.

If we know where the laser 315 is hitting the head mirror 320 (from an auto-alignment process using faceted mirror 370) and where the head mirror 320 is located (from the navigation unit 380), we know where the line of sight (LOS) is directed—where the laser 315 is located. Where a "directly out" location is desired, the auto-alignment process through a processing of the reflected error sensing beam 375 onto photo-potentiometers ("photopots") can correct for errors to place the laser back into a "directly out" position—a nulling of the photopots.

In particular embodiments, a scale factor may be utilized where the LOS is other than directly out. For example, in addition to traditional positioning of the laser 315 (e.g., a mechanical rotation of the mast), the laser 315 may be positioned in a direction using the beam-steering functionality of electronics within the vehicle (described in more details below). In such a scenario, the auto-alignment system is aware that the particular direction the laser 315 is pointed is desired. In such scenarios, the auto-alignment system can correct errors to such a desired non-"directly out" position.

As will be described in more details below, in particular embodiments, at least two beam-steering mirrors may be utilized to correct the positioning of the laser 315 on the head mirror 320. In particular embodiments, this may prevent the laser 315 from walking off the head mirror 320. Specifically, by utilizing two two-axis mirrors, four degrees of freedom can be provided. These four degrees of freedom control angle and translation. With respect to the specific view in FIG. 3, this would correspond to a left and right movement of the laser 315 with respect to the head mirror 320 as well as a movement of the laser 315 in and out of the paper with respect to the head mirror 320.

As can be seen with reference to FIGS. 2 and 3, certain benefits can be obtained over the configuration shown in FIG. 1. For example, because all the electronics are placed in the vehicle 240 as opposed to on top of the vehicle 240, one may be able to easily change out benches while (in some configurations) reusing the upper head mast 210, 310. Such new benches may be future developed systems. Additionally, in particular configurations, because the space in vehicles may have fewer limitations, more than one system may be placed within the vehicle. In such configurations, such different systems may utilize the same head mirror 220, 320. To accommodate as necessary, in particular configurations, the mast 210, 310 may be adjustable in height.

In particular sensing configurations, range to target is important parameter for sensing. The range is defined from the head mirror, the final optical element of the system. In one configuration, a range finder can be integrated or folded into the same optical path as the laser 315. In such a configuration, one can run fibers up to the top of the mast and place them in the four corners of the head mirror 320 such that when the laser 315 hits the ground, the four corners of the laser 315 can be measured.

In another configuration, the range finders can be located inside the vehicle. To account for mast flexing, this particular configuration may use a corner cube at the head mirror 320 to calculate internal range fluctuations. In this configuration, the range finder could be a dedicated unit or integral to the laser (such as a pulsed laser)

In particular configurations where an IMU is used for the navigation unit 380, there is a lack of excitation on the IMU and thus, it can become difficult to measure variance from truth. Unlike aircraft which can bank or roll, a ground vehicle cannot do so. Accordingly, to confirm whether variance from truth has occurred, the IMU may be correlated with a global position system (GPS) unit 372. Other techniques for confirming variance from truth include correlation with speedometers, magnetometers, and other geolocation techniques. As seen in FIG. 3, the GPS unit 372 is positioned in close proximity to the navigation unit 380—being co-located therewith. This can improve the performance of the navigation system, but it not necessary. The GPS unit can be placed anywhere on the vehicle and integrated with a sufficient transfer alignement scheme.

Figure 4:
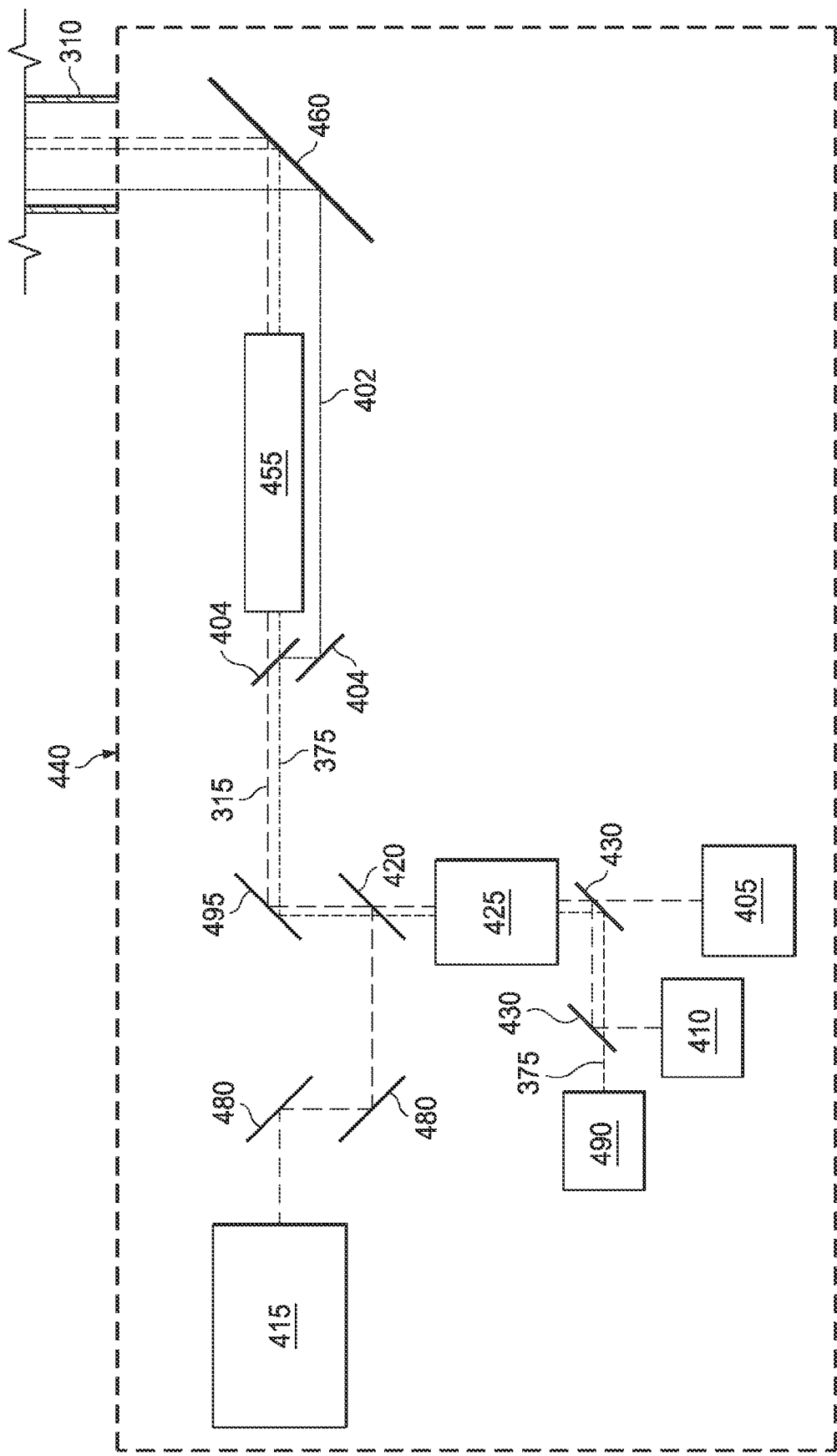
FIG. 4 is an example system that may be used with the head mast and head mast mirror of FIG. 3, according to an embodiment of the disclosure.

FIG. 4 is an example system 400 that may be used with the head mast 310 and head mast mirror 320 of FIG. 3, according to an embodiment of the disclosure. Although specific features will be shown in the system 400, it should be understood that other embodiments may include more, less, or different components with the head mast 310 and head mast mirror 320. Additionally, components of FIG. 4 may be utilized with modified components of FIG. 3.

The system 400 of FIG. 4 generally shows a vehicle 440 that stores image or laser equipment. An optical pass feeds optics up to through mast 310 to mast mirror 320

The embodiment of FIG. 4 shows the use of multiple sensing systems. In particular, the system 400 includes passive sensors, for example, an infrared (IR) focal plane array 405 and a visible focal plane array 410, and active sensors, for example, a laser transmit/receive module 415. Mirrors 480, 495 may be used to guide optical beams to and from the active sensors, such as the laser transmit/receive module 415. A dichroic beam splitter 420 is used to separate the optical paths for the passive sensors and the active sensors. In the illustrated example, the passive path includes a relayed imager 425, and additional dichroic beam splitters 430 are used to direct the optical beams to the various passive sensors.

Also shown is afocal foreoptics 455 and pointing mirrors 460 (e.g, a fast steering mirror). In particular embodiments, alternative path 402 may be provided using mirrors 404 in the case afocal foreoptics 455 need to be avoided, for example, for particular system measurements.

With reference to FIGS. 3 and 4, optical beams (e.g., laser 315) pass from the pointing mirror 460 and head mirror 320 to object space, and vice versa. A beam-steering mirror 495 is used to steer the line of sight of the sensors, as discussed further below.

As referenced above, in one embodiment, a double-pass auto-alignment error sensing technique is used for line-of-sight error sensing. Referring again to FIGS. 3 and 4, an error sensing beam 375 (indicated by dashed line) is emitted from an error sensing module 490. This error sensing beam 375 travels through the optical components of the system 400 along the same path as laser 315 at least from the beam-steering mirror 495. The error sensing beam is then reflected off the faceted mirror 370 for travel back through the system back to the error sensing module 490.

The error-sensing module 490 may include any suitable beam source and sensing detector (e.g., photopots) for detecting beams reflected off of faceted mirrors 370. Although shown as one module in this configuration, the error sensing module 490 may be more than one module—e.g., splitting beam source and sensing detector. In the case that a single module is used, a beam splitter can be used to separate the forward and return optical paths of the error sensing beam 375 within the error-sending module 490.

Errors generated from the movement of head mirror 320 (e.g., due to flexure of mast 310) or jitter in the system is observed by the error sensing module 490 and used to apply corrections to the beam-steering mirror 495.

As referenced infra, although generally shown as a single beam-steering mirror 495, beam-steering mirror 495 may be two beam-steering mirrors—each with two different axes. Utilizing two two-axis mirrors, four degrees of freedom can be provided. These four degrees of freedom control angel and translation to avoid the laser from walking off the head mirror 320. Yet other configurations may also be utilized to prevent the line of sight or laser from walking off the head mirror.

Figure 5:
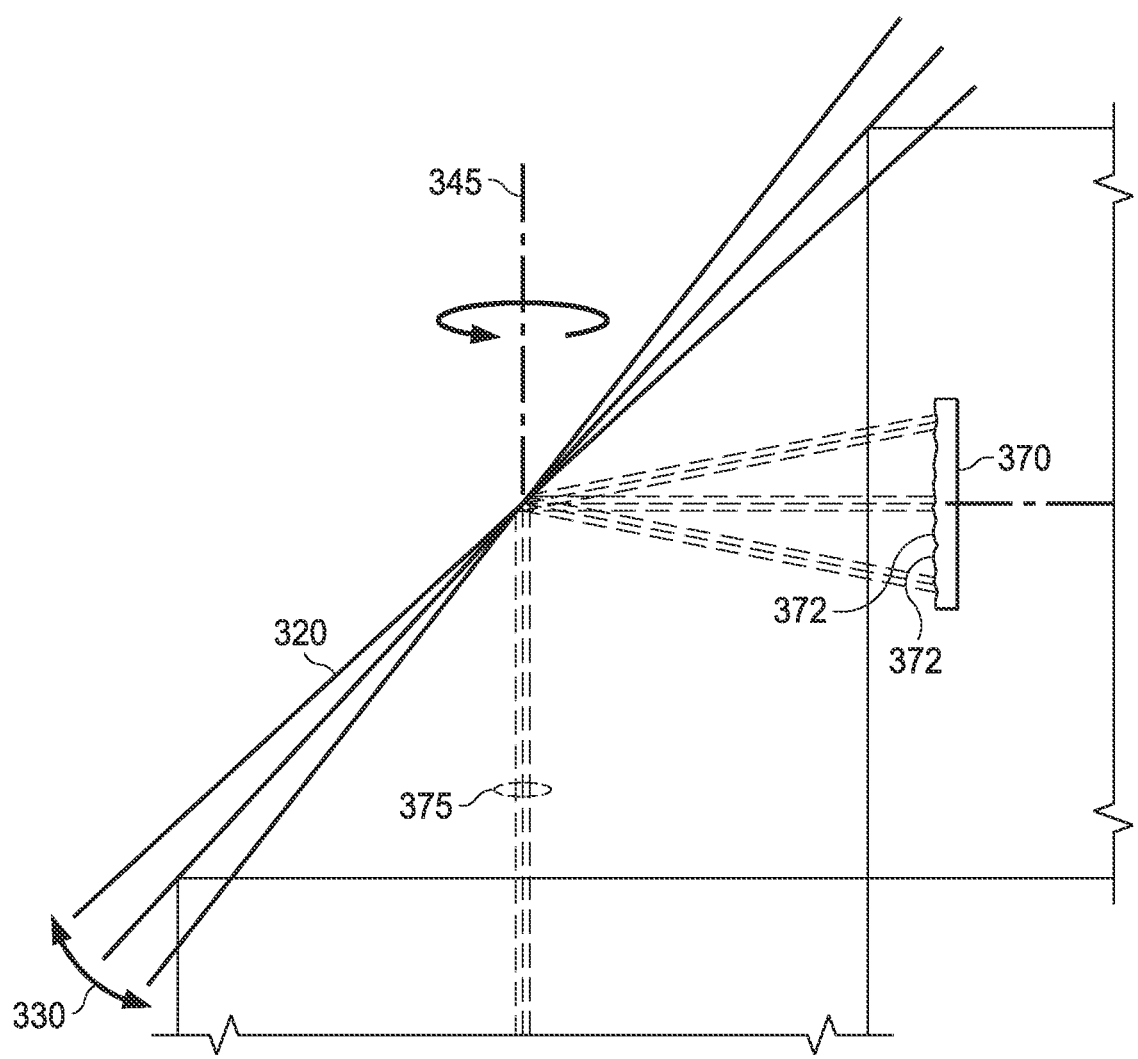
FIG. 5 is a non-limiting example of a faceted mirror, according to an embodiment of the disclosure.

FIG. 5 is a non-limiting example of a faceted mirror 370, according to an embodiment of the disclosure. In FIG. 5, the faceted mirror 370 is located on the object space side of axis 345. In particular embodiments, the head mirror 320 may be a 2:1 gain flex-pivoted flat fold mirror. The faceted mirror 370 includes a reflective face that is formed with a plurality of facets 372, each angled slightly with respect to adjacent facets.

Angular movement 330 of the head mirror 320 (e.g., due to flexure of the mast) causes the error sensing beam 375 to translate from facet to facet of the faceted mirror 370. The tilt angle of each facet 372 may differ from that of its nearest neighbor facet by a specified number of degrees, for example, one degree (1°). As a result, every 0.5° of angular motion of the head mirror 320 causes a 1° line of sight elevation movement and may cause the facet reflected error sensing beam 375 to return back to a center of a field of view on a photopot in the error-sensing module 490. The faceted mirror 370 may be designed with facets 372 that are angled with respect to one another by an amount other than 1°. For example, the difference between the angles of the facet 372 may be selected based on a desired size of faceted mirror 370, number of facet 372, and/or expected range of angular motion of the head mirror 320. Additionally, although particular example configurations are provided herein, other configurations will become apparent to one of ordinary skill in the art after review of this specification.

In particular embodiments, the auto-alignment system (including error-sensing module 490, error sensing beam 375, and faceted mirror 370) removes the line of sight bias from the laser. This mechanism allows for accurate line of sight error sensing because the error sensing beam double-passes and samples all optical surfaces in the line of sight optical path.

Further details of how an error is detected using faceted mirror that reflect back to photopots is described in U.S. patent application Ser. No. 13/286,362 filed on Nov. 1, 2011 and assigned to the assignee of the present application. U.S. patent application Ser. No. 13/286,362 is hereby incorporated by reference in its entirety. Additionally, any suitable system (including any suitable logic) may be used to calculate deviation from a desired line of sight using, for example, detecting variances in error sensing beam 375 reflected from faceted mirror 370. Non-limiting examples include general and special purpose computers that may include processing units and memory.

In yet an alternative configuration, the auto-alignment source is placed at the head mirror, and the auto-alignment system is only single pass. Because of the large angle of the head-mirror and the lack of a faceted mirror, the auto-alignment system cannot measure true line of sight, but rather the line of sight of all optics except the head mirror. The head-mirror angle may be measured using traditional techniques (e.g. resolver or fine position sensors) and then combined with the auto-alignment result to generate the line of sight.

Although another error source (head mirror sensor) is introduced (that is generally poorer in noise floor and bandwidth to the auto-alignment system), relatively accurate system is still yielded.

It will be understood that well known processes have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An optical sensor system comprising:
    a mast configured to be elevated from a vehicle;
    a mast mirror configured to reflect signals to or from object space along a line of sight, the mast mirror positioned on top of the mast;
    a navigation unit configured to determine a location and attitude of the mast mirror;
    one or more faceted mirrors configured to reflect an error sensing beam, the reflected error sensing beam revealing a flexure of the mast mirror, each of the one or more faceted mirrors having a plurality of facets; and
    at least two beam-steering mirrors configured to prevent the line of sight for the signals reflected off the mast mirror from walking off the mast mirror by adjusting an angle and translation of the signals reflected off the mast mirror, the adjustment of the at least two beam-steering mirrors based on the reflected error sensing beam;
    wherein the optical sensor system is configured such that angular movement of the mast mirror due to the flexure of the mast mirror causes the error sensing beam to translate from one of the facets to another of the facets.

2. The system of claim 1, wherein the mast is configured to be elevated from a ground vehicle.

3. The system of claim 2, further comprising:
    one or more sensors configured to analyze the signals from object space, the one or more sensors configured to be positioned inside the ground vehicle.

4. The system of claim 3, wherein the one or more sensors are changeable with a new sensor configured to re-use the mast and mast mirror.

5. The system of claim 1, wherein:
    the navigation unit comprises at least one accelerometer and at least one gyroscope; and
    the system further comprises a global positioning system (GPS) unit co-located with the navigation unit.

6. The system of claim 1, wherein the signals include a laser beam that is reflected to object space along the line of sight.

7. The system of claim 6, further comprising:
    a range finder configured to be pumped in a same optical path as the laser beam.

8. The system of claim 6, wherein the optical sensor system is configured to propagate the error sensing beam along a same path as the laser beam from the beam-steering mirrors to the mast mirror.

9. The system of claim 1, further comprising:
    a range finder with a pulsed laser configured to calculate an internal range fluctuation with a corner cube at the mast mirror or with the mast mirror.

10. An optical sensor system comprising:
    a mast configured to be elevated from a vehicle;
    a mast mirror configured to reflect signals to or from object space along a line of sight, the mast mirror positioned on top of the mast, wherein the signals include a laser beam that is reflected to object space along the line of sight;
    a navigation unit configured to determine a location and attitude of the mast mirror;
    one or more faceted mirrors configured to reflect an error sensing beam, the reflected error sensing beam revealing a flexure of the mast mirror;
    at least two beam-steering mirrors configured to prevent the line of sight for the signals reflected off the mast mirror from walking off the mast mirror by adjusting an angle and translation of the signals reflected off the mast mirror, the adjustment of the at least two beam-steering mirrors based on the reflected error sensing beam;
    a range finder configured to be pumped in a same optical path as the laser beam; and
    a range-finding fiber in each corner of the mast mirror.

11. An optical sensor system comprising:
    a mast configured to be elevated from a vehicle;
    a mast mirror configured to reflect signals to or from object space along a line of sight, the mast mirror positioned on top of the mast;
    a navigation unit configured to determine a location and attitude of the mast mirror; and
    one or more faceted mirrors configured to reflect an error sensing beam, the reflected error sensing beam revealing a flexure of the mast mirror, each of the one or more faceted mirrors having a plurality of facets;
    wherein the optical sensor system is configured such that angular movement of the mast mirror due to the flexure of the mast mirror causes the error sensing beam to translate from one of the facets to another of the facets.

12. The system of claim 11, wherein the mast is configured to be elevated from a ground vehicle.

13. The system of claim 12, further comprising:
    one or more sensors configured to analyze the signals from object space, the one or more sensors configured to be positioned inside the ground vehicle.

14. The system of claim 13, wherein the one or more sensors are changeable with a new sensor configured to re-use the mast and mast mirror.

15. The system of claim 11, wherein:
    the navigation unit is an inertial measurement unit (IMU); and the system further comprises a global positioning system (GPS) unit co-located with the IMU.

16. The system of claim 11, wherein the signals include a laser beam that is reflected to object space along the line of sight.

17. The system of claim 16, further comprising:
a range finder configured to be pumped in a same optical path as the laser beam.

18. The system of claim 16, further comprising:
a beam-steering mirror;
wherein the optical sensor system is configured to propagate the error sensing beam along a same path as the laser beam from the beam-steering mirror to the mast mirror.

19. The system of claim 11, further comprising:
a range finder with a pulsed laser configured to calculate an internal range fluctuation with a corner cube at the mast mirror or with the mast mirror.

20. An optical sensor system comprising:
a mast configured to be elevated from a vehicle;
a mast mirror configured to reflect signals to or from object space along a line of sight, the mast mirror positioned on top of the mast, wherein the signals include a laser beam that is reflected to object space along the line of sight;
a navigation unit configured to determine a location and attitude of the mast mirror;
one or more faceted mirrors configured to reflect an error sensing beam, the reflected error sensing beam revealing a flexure of the mast mirror;
a range finder configured to be pumped in a same optical path as the laser beam; and
a range-finding fiber in each corner of the mast mirror.

* * * * *